United States Patent Office 2,950,337
Patented Aug. 23, 1960

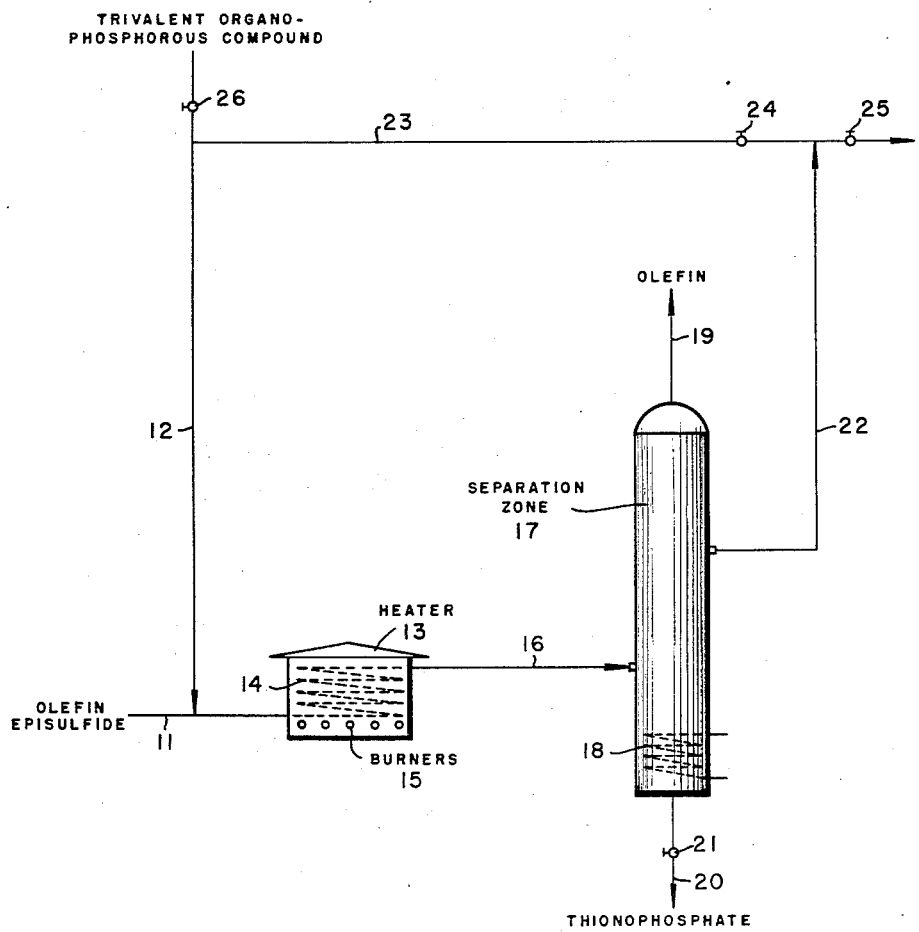

2,950,337

PREPARATION OF OLEFINS FROM OLEFIN EPISULFIDES

Norman P. Neureiter, Baytown, Tex., assignor, by mesne assignments, to Esso Research and Engineering Company, Elizabeth, N.J., a corporation of Delaware Filed Sept. 17, 1958, Ser. No. 761,532

5 Claims. (Cl. 260—677)

The present invention is directed to the preparation of olefins. More particularly, the invention is directed to preparation of olefins from an olefin episulfide. In its more specific aspects, the invention is concerned with preparation of substantially pure olefins from episulfides.

The present invention may be briefly described as a method for preparing an olefin in which there are heated together an olefin episulfide having from 2 to about 15 carbon atoms in the molecule and a trivalent organo-phosphorous compound selected from the group consisting of the phosphines and phosphites at a reaction temperature within the range from about 100° to about 300° C. and at a pressure sufficient to maintain the reactants in the liquid phase whereby an olefin is formed which retains the stereochemistry of the episulfide and thereafter recovering the olefin.

The episulfide, as stated, may have from 2 to about 15 carbon atoms in the molecule and may be a mono-olefin or a diolefin episulfide. Illustrative of the mono-olefin episulfides are cyclohexane episulfide, ethylene episulfide, propylene episulfide, the 2-butene episulfides, the pentene episulfides and the higher members of the homologous series. As exemplary of the diolefin episulfides may be mentioned butadiene mono- and diepisulfide, piperylene mono- and diepisulfide, and 2,4-hexadiene mono- and diepisulfide.

The reaction temperature is within the range from about 100° to about 300° C. The reaction temperature should be above the boiling point of the olefin formed from the episulfide but below the boiling point of the trivalent organo-phosphorous compound. Likewise, the reaction temperature must be below the decomposition temperature of the trivalent organo-phosphorous compound. Temperatures within the range from about 100° to about 300° C. fulfill these requirements.

The organo-phosphorous compound is employed in a mol ratio to episulfide in the range from about 1:1 to about 10:1. Preferably, an excess ratio of the organo-phosphorous compound is employed; and a preferred ratio of about 5 mols of the trivalent organo-phosphorous compound is employed per mole of episulfide.

The trivalent organo-phosphorous compounds operable in the present invention are the phosphines and phosphites. Illustrative of the phosphites are triethyl phosphite, tripropyl phosphite, tributyl phosphite, diethyl-propyl phosphite, triisopropyl phosphite, triphenyl phosphite,

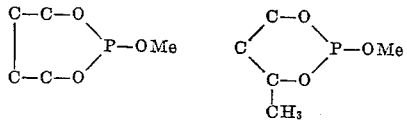

and trimethyl phosphite. Illustrative of the phosphine compounds may be mentioned triphenyl phosphine, tri-amyl phosphine, triisoamyl phosphine, tri-p-tolyl phosphine, tripropyl phosphine, tributyl phosphine, diethyl-phenyl phosphine, dipropyl phenyl phosphine, and

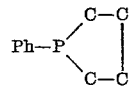

The contact time during which the heating operation occurs to produce the olefin may range from about 1 second up to about 300 seconds at the reaction temperature.

By virtue of the boiling point of the olefin produced from the episulfide, the olefin may be recovered in substantially pure form and the reaction goes to substantial completion with substantially 100% yield.

The invention will be further illustrated by the following examples.

*Example 1.*—Triethyl phosphite and trans-2-butene sulfide are placed in a reaction vessel with the triethyl phosphite employed in a mol ratio of about 10:1 and the reactants are heated to a temperature of 120° C. The gaseous reaction products are led off through a condenser and collected in a cold trap. Substantially 100% yields of trans-2-butene are obtained after a few minutes' reaction at the temperature of about 120° C.

*Example 2.*—The operation is repeated with cis-2-butene sulfide with substantially identical results in the purity and yield of the cis-2-butene.

*Example 3.*—The reaction is repeated with 2-pentene sulfide, 2-octene sulfide, and cyclohexene sulfide at temperatures up to about 160° C. in the liquid phase employing triphenyl phosphine as a reactant. The corresponding substantially pure mono-olefins are recovered in substantially 100% yield.

The invention will be further illustrated by reference to the drawing in which the sole figure is a flow diagram of a preferred mode.

Referring now to the drawing, numeral 11 designates a charge line by way of which an olefin episulfide of the type mentioned is introduced into the system from a source not shown. Admixed in line 11 with the olefin episulfide by way of line 12 is a trivalent organo-phosphorous compound of the type mentioned, the organo-phosphorous compound and the olefin episulfide being employed in a ratio as given supra. The mixture is discharged into a heater 13 provided with a coil 14 which is heated by gas burners or other heating means 15 to raise the temperature of the mixture to a temperature in the range from about 100° to about 300° C. The contact time within the heating coil 14 to cause reaction may be in the range from about 1 second to about 300 seconds. The product discharges from the coil 14 by line 16 into a separation zone 17 which is illustrated as a fractional distillation zone equipped with all auxiliary equipment usually found in the modern fractional distillation zone such as vapor-liquid contacting means, condensing and cooling means, and the like. Separation zone 17 is shown provided with a temperature adjusting means 18 which may be a heating means such as a steam coil or under some circumstances may actually be a cooling means. In any event, temperatures are adjusted in zone 17 to remove the pure olefin by way of line 19 and to discharge the resulting thionophosphate when the organo-phosphorous compound is a phosphite by way of line 20 controlled by valve 21. Any unreacted trivalent organo-phosphorous compound may be withdrawn by line 22 for recycling to line 12 by line 23 controlled by valve 24. In the case that it is desired to use the organo-phosphorous compound on a once-through basis, any unreacted amount may be discharged from the system by opening valve 25. Fresh trivalent organo-phosphorous compound is introduced into line 12 by manipulation of valve 26.

Although separation zone 17 has been illustrated as a fractional distillation zone, it may simply be a large vessel which may be operated at a reduced pressure if desired to flash off from the reactants the purified olefin. Likewise, while a continuous operation has been illustrated with reference to the drawing, reaction and separation may be conducted in a single vessel by appropriate selection of the reactants and reaction temperatures. For example, in the specific operations given in the several examples, a reaction vessel was employed and the purified olefin was led off as a vaporous product.

The present invention is quite important and useful in that high yields of purified olefins are obtainable from the corresponding olefin episulfides. The reaction is unique in that the stereochemistry of the olefin episulfide is retained. In other words, substantially pure cis or trans olefins may be produced in accordance with the present invention.

The present invention also has importance and utility in separating cis and trans olefins by reacting a mixture of cis and trans olefins to form epoxides which are readily separable from each other by distillation and thereafter reacting the separated epoxides with either thiourea or potassium thiocyanate to form the corresponding episulfides which are then reacted in accordance with the present invention to recover either the pure cis or trans olefins.

The nature and objects of the present invention having been completely described and illustrated, what I wish to claim as new and useful and secure by Letters Patent is:

1. A method for preparing an olefin which comprises heating together an olefin episulfide having from 2 to about 15 carbon atoms in the molecule and a trivalent organo-phosphorous compound selected from the group consisting of the phosphines and phosphites at a reaction temperature within the range from about 100° to about 300° C. at a pressure sufficient to maintain the episulfide and organo-phosphorous compound in the liquid phase to form an olefin having the same stereochemistry as the episulfide and recovering said olefin.

2. A method in accordance with claim 1 in which the olefin episulfide is a 2-butene episulfide and the organo-phosphorous compound is triethyl phosphite.

3. A method in accordance with claim 1 in which the organo-phosphorous compound is employed in a mol ratio to episulfide in the range from about 1:1 to about 10:1.

4. A method in accordance with claim 1 in which the olefin episulfide is cis-2-butene episulfide, the organo-phosphorous compound is triethyl phosphite, the reaction temperature is about 120° C., and atmospheric pressure is employed.

5. A method in accordance with claim 1 in which the olefin episulfide is trans-2-butene episulfide, the organo-phosphorous compound is triethyl phosphite, the reaction temperature is about 120° C., and atmospheric pressure is employed.

References Cited in the file of this patent
UNITED STATES PATENTS

| | | |
|---|---|---|
| 2,220,430 | Stanley | Nov. 5, 1940 |
| 2,382,749 | Singleton | Aug. 14, 1945 |